United States Patent
Zhou et al.

(10) Patent No.: US 11,236,467 B2
(45) Date of Patent: Feb. 1, 2022

(54) FABRIC PRINTABLE MEDIUM

(71) Applicant: Hewlett-Packard Development Company, L.P., Spring, TX (US)

(72) Inventors: Xiaoqi Zhou, San Diego, CA (US); Xulong Fu, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/767,006

(22) PCT Filed: Feb. 26, 2018

(86) PCT No.: PCT/US2018/019717
§ 371 (c)(1),
(2) Date: May 26, 2020

(87) PCT Pub. No.: WO2019/164530
PCT Pub. Date: Aug. 29, 2019

(65) Prior Publication Data
US 2021/0079591 A1 Mar. 18, 2021

(51) Int. Cl.
*D06P 1/52* (2006.01)
*D06P 5/00* (2006.01)
(Continued)

(52) U.S. Cl.
CPC ............. *D06P 5/30* (2013.01); *D06M 13/322* (2013.01); *D06P 1/5221* (2013.01);
(Continued)

(58) Field of Classification Search
CPC ........ D06P 5/30; D06P 1/5221; D06P 1/5271; D06P 1/5285; D06P 1/628; D06P 5/001;
(Continued)

(56) References Cited

U.S. PATENT DOCUMENTS 6,001,137 A  12/1999  Alfekri et al.
6,326,323 B1  12/2001  Shimano et al.
(Continued)

FOREIGN PATENT DOCUMENTS

WO  WO-2011143078 A1  11/2011
WO  WO-2014014453 A1  1/2014
(Continued)

OTHER PUBLICATIONS

"Advanced Textiles Division", Diatex Technical fabrics manufacturer, Apr. 2015, 20 pages, www.diatex.com.

*Primary Examiner* — Yaovi M Ameh
(74) *Attorney, Agent, or Firm* — HP Inc. Patent Department

(57) ABSTRACT

A fabric printable medium comprising a fabric printable medium, with an image-side and a back-side, comprising a fabric base substrate; an image-receiving coating layer, applied on the image-side of printable medium, comprising a first and a second crosslinked polymeric network; a fire retarding barrier layer, applied to the back-side of the printable medium comprising polymeric binder and filler particles with flame retardancy properties; and, at least, a migration control finish layer comprising a film-formable polymer and a flame retardant agent, at a coat-weight ranging from about 0.5 to 10 gsm. Also disclosed are the method for making such fabric printable medium and the method for producing printed images using said material.

10 Claims, 2 Drawing Sheets

(51) Int. Cl.
- *D06P 5/30* (2006.01)
- *D06M 13/322* (2006.01)
- *D06P 1/62* (2006.01)
- *D06P 5/22* (2006.01)
- *C09D 11/30* (2014.01)
- *D06N 3/00* (2006.01)
- *C09D 5/18* (2006.01)

(52) U.S. Cl.
CPC .......... *D06P 1/5271* (2013.01); *D06P 1/5285* (2013.01); *D06P 1/628* (2013.01); *D06P 5/001* (2013.01); *D06P 5/002* (2013.01); *D06P 5/22* (2013.01); *C09D 5/18* (2013.01); *C09D 11/30* (2013.01); *D06M 2200/30* (2013.01); *D06N 3/0059* (2013.01); *D06N 3/0063* (2013.01); *D06P 1/5228* (2013.01); *D06P 1/5235* (2013.01); *D06P 1/5257* (2013.01)

(58) Field of Classification Search
CPC .......... D06P 5/22; D06P 5/002; D06P 1/5235; D06P 1/5228; D06P 1/5257; D06M 13/322; D06M 2200/30; C09D 11/30; C09D 5/18; D06N 3/0063; D06N 3/0059
See application file for complete search history.

(56) References Cited

U.S. PATENT DOCUMENTS

| | | |
|---|---|---|
| 6,478,980 B2 | 11/2002 | Nigam |
| 6,670,001 B2 | 12/2003 | Kohsaka |
| 6,689,517 B1 | 2/2004 | Kaminsky et al. |
| 2003/0157303 A1 | 8/2003 | Li et al. |
| 2005/0009429 A1 | 1/2005 | Park et al. |
| 2005/0245156 A1 | 11/2005 | Cates et al. |
| 2006/0281849 A1 | 12/2006 | Johnson |
| 2010/0024103 A1 | 2/2010 | Kelleher et al. |
| 2011/0102497 A1 | 5/2011 | Sato et al. |
| 2014/0044897 A1* | 2/2014 | Zhou .................... B41M 5/0017 428/32.22 |
| 2016/0059606 A1 | 3/2016 | Zhou et al. |
| 2016/0152060 A1* | 6/2016 | Zhou .................... B32B 27/32 347/20 |
| 2016/0159107 A1 | 6/2016 | Niu |
| 2016/0243870 A1* | 8/2016 | Fu .................... G03G 7/0086 |

FOREIGN PATENT DOCUMENTS

| | | |
|---|---|---|
| WO | WO-2015009271 | 1/2015 |
| WO | WO-2015142313 | 9/2015 |
| WO | WO-2017196354 | 11/2017 |

* cited by examiner

FABRIC PRINTABLE MEDIUM

BACKGROUND

Inkjet printing technology has expanded its application to large format high-speed, commercial and industrial printing, in addition to home and office usage, because of its ability to produce economical, high quality, multi-colored prints. This technology is a non-impact printing method in which an electronic signal controls and directs droplets or a stream of ink that can be deposited on a wide variety of medium substrates. Inkjet printing technology has found various applications on different substrates including, for examples, cellulose paper, metal, plastic, fabric and the like. The substrate plays a key role in the overall image quality and permanence of the printed images. Textile printing has various applications including the creation of signs, banners, artwork, apparel, wall coverings, window coverings, upholstery, pillows, blankets, flags, tote bags, etc. It is a growing and evolving area and is becoming a trend in the visual communication market. As the area of textile printing continues to grow and evolve, the demand for new printable mediums increases.

BRIEF DESCRIPTION OF THE DRAWINGS

The drawings illustrate various examples of the present fabric printable medium and are part of the specification.

DETAILED DESCRIPTION

Figure 1:
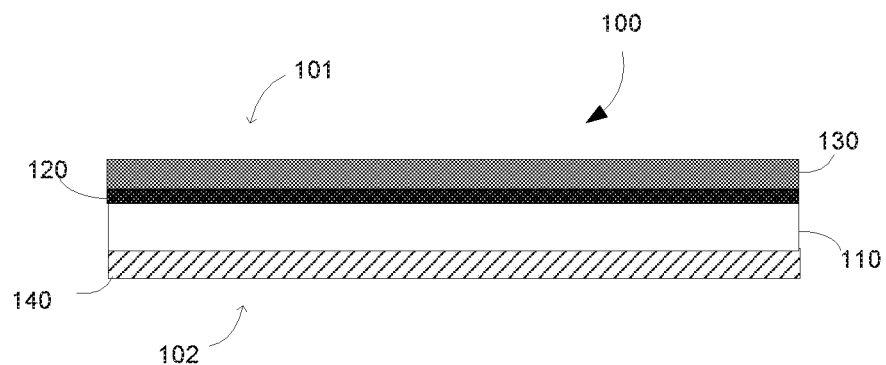
FIG. 1 and FIG. 2 are a cross-sectional view of the fabric printable medium according to some examples of the present disclosure.

Before particular examples of the present disclosure are disclosed and described, it is to be understood that the present disclosure is not limited to the particular process and materials disclosed herein. It is also to be understood that the terminology used herein is used for describing particular examples only and is not intended to be limiting, as the scope of protection will be defined by the claims and equivalents thereof. In describing and claiming the present article and method, the following terminology will be used: the singular forms "a", "an", and "the" include plural referents unless the context clearly dictates otherwise. Concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For examples, a weight range of about 1 wt % to about 20 wt % should be interpreted to include not only the explicitly recited concentration limits of 1 wt % to 20 wt %, but also to include individual concentrations such as 2 wt %, 3 wt %, 4 wt %, and sub-ranges such as 5 wt % to 15 wt %, 10 wt % to 20 wt %, etc. All percentages are by weight (wt %) unless otherwise indicated. As used herein, "image" refers to marks, signs, symbols, figures, indications, and/or appearances deposited upon a material or substrate with either visible or an invisible ink composition. Examples of an image can include characters, words, numbers, alphanumeric symbols, punctuation, text, lines, underlines, highlights, and the like.

When printing on fabric substrates, challenges exist due to the specific nature of fabric. Indeed, often, fabric does not accurately receive inks. Some fabrics, for instance, can be highly absorptive, diminishing color characteristics, while some synthetic fabrics can be crystalline, decreasing aqueous ink absorption leading to ink bleed. These characteristics result in the image quality on fabric being relatively low. Additionally, black optical density, color gamut, and sharpness of the printed images are often poor compared to images printed on cellulose paper or other media types. Durability, such as rubbing resistance, is another concern when printing on fabric, particularly when pigmented inks and ink compositions containing latex are used. Furthermore, when fabric is intended to be used in close proximity to indoor environments (as drapes, as overhead signage, as part of furnishings, or the like), there are concerns about flame resistance as well as about using coatings that increase the flammability of the fabric. Thus, fire/flame resistance or inhibition characteristics are also desirable when providing printable fabrics.

In one example, the present disclosure is drawn to a fabric printable medium, with an image-side and a back-side, comprising a fabric base substrate; an image-receiving coating layer, applied on the image-side of printable medium, comprising a first and a second crosslinked polymeric network; a fire retarding barrier layer, applied to the back-side of the printable medium, comprising polymeric binders and filler particles with flame retardancy properties; and, at least, a migration control finish layer comprising a film-formable polymer and a flame retardant agent, at a coat-weight ranging from about 0.5 to 10 gsm. The present disclosure also relates to a method for forming said fabric printable medium and to the printing method using said fabric printable medium.

The fabric printable medium, according to the present disclosure, is a printable recording medium (or printable media) that provide printed images that have outstanding print durability and excellent scratch resistance while maintaining good jettability (i.e. printing performance). In addition, the fabric printable medium has good flame resistance properties. By "scratch resistance", it is meant herein that the composition is resistant to any modes of scratching which include, scuff and abrasion. By the term "scuff", it is meant herein damages to a print due to dragging something blunt across it (like brushing fingertips along printed image). Scuffs do not usually remove colorant but they do tend to change the gloss of the area that was scuffed. By the term "abrasion", it is meant herein the damage to a print due to wearing, grinding or rubbing away due to friction. Abrasion is correlated with removal of colorant (i.e. with the OD loss). In some examples, the fabric printable medium described herein is a coated printable media that can be printed at speeds needed for commercial and other printers such as, for example, HP Latex printers such as 360, 560, 1500, 3200 and 3600 (HP Inc., Palo Alto, Calif., USA). The image printed on the fabric printable medium of the present disclosure exhibits excellent printing qualities and durability. By using coating compositions, in combination with fabric substrate, the printing process is more accurate and the printed image is more permanent. The resultant printed fabric will also be able to provide fire/flame resistance or inhibition to the fabric. The present disclosure refers to a fabric printable medium comprising a fabric base substrate and coating compositions applied to said fabric base substrate. The coating compositions, also called treatment compositions, once applied on the fabric base substrate, form thin layers onto the fabric base surface.

Figure 2:
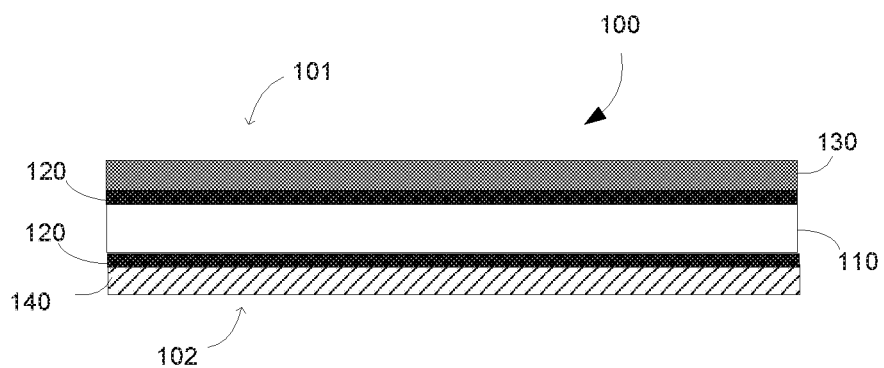
Figure 3:
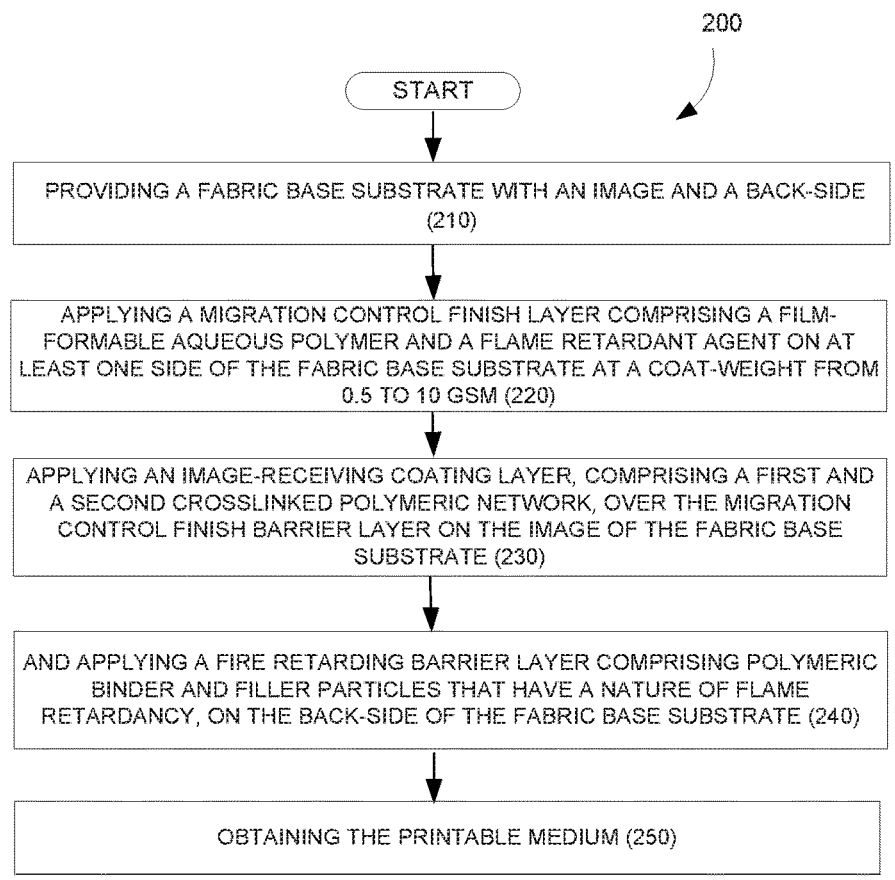
FIG. 3 is a flowchart illustrating a method for producing the fabric printable medium according to one example of the present disclosure.
Figure 4:
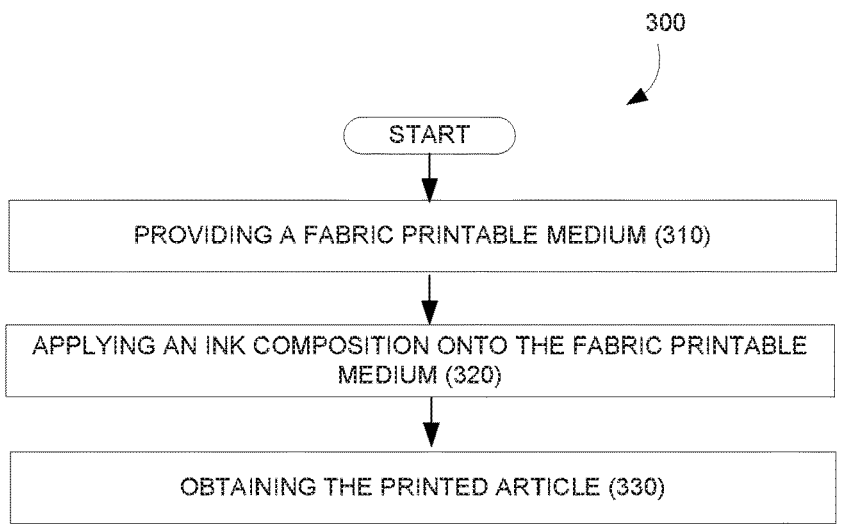
FIG. 4 is a flowchart illustrating a method for producing printed images according to one example of the present disclosure.

FIG. 1 and FIG. 2 schematically illustrate some examples of the fabric printable medium (100) as described herein. FIG. 3 is a flowchart illustrating an example of a method for producing the fabric printable medium. FIG. 4 is a flowchart illustrating an example of printing method comprising obtaining a fabric printable medium as described therein and applying an ink composition onto said fabric printable medium to form a printed image.

As will be appreciated by those skilled in the art, FIG. 1 and FIG. 2 illustrate the relative positioning of the various layers of the printable media or printed article without necessarily illustrating the relative thicknesses of the various layers. It is to be understood that the thickness of the various layers is exaggerated for illustrative purposes. As illustrated in FIGS. 1 and 2, the fabric printable medium (100) encompasses a fabric base substrate, or supporting base substrate or bottom supporting substrate (110), and several coating layers: at least a migration control finish layer (120), an image-receiving coating layer (130) and fire retarding barrier layer (140). The fabric printable medium has two surfaces: a first surface, which is coated with image-receiving layer, which might be referred to as the "image receiving side", "image surface" or "image side" (101) (i.e. where the image will be printed) and a second surface, the opposite surface, which might be referred to as the "back surface" or "back-side" (102).

In some examples, such as illustrated in FIG. 1, the fabric printable medium (100) encompasses a fabric base substrate (110), a migration control finish layer (120) and an image-receiving coating layer (130) applied on the image-side (101) of the printable media (100). A fire retarding barrier layer (140) is applied on the back-side (102) of the printable media (100). In some other examples, such as illustrated in FIG. 2, the fabric printable medium (100) encompasses a fabric base substrate (110) with migration control finish layers (120) that are applied on both sides (on the image and on the back-side) of the fabric printable medium (100). The image-receiving coating layer (130) is applied over said migration control finish layer (120) on the image-side (101) of the printable media (100). The fire retarding barrier layer (140) is applied, over the migration control finish layer (120), on the back-side (102) of the printable media (100).

An example of a method (200) for forming a fabric printable medium in accordance with the principles described herein, by way of illustration and not limitation, is shown in FIG. 3. As illustrated in FIG. 3, such method encompasses providing (210) a fabric base substrate with an image-side and a back-side; applying (220) a migration control finish layer on at least one side of the fabric base substrate; applying (230) an image-receiving coating layer over the migration control finish layer on the image of the fabric base substrate; and applying (240) a fire retarding barrier layer on the back-side of the fabric base substrate in order to obtain (250) the fabric printable medium. An example of a printing method in accordance with the principles described herein, by way of illustration and not limitation, is shown in FIG. 4. FIG. 4 illustrates examples of the printing method (300) that encompasses: providing a fabric printable medium (310) as described herein, applying an ink composition onto said a printable medium (320) and obtaining a printed article (330).

The Fabric Base Substrate

A fabric printable medium (100) of the present disclosure, that can also be called herein printable recording media, is a fabric media that comprises a fabric base substrate (110). The fabric base substrate (110) can also be called bottom supporting substrate or fabric supporting substrate. The word "supporting" also refers to a physical objective of the substrate that is to carry the coatings layer and the image that is going to be printed.

Regarding such fabric base substrate, any textile, fabric material, fabric clothing, or other fabric product where there is a desire for application of printed matter can benefit from the principles described herein. More specifically, fabric substrates useful in present disclosure include substrates that have fibers that may be natural and/or synthetic. The term "fabric" as used to mean a textile, a cloth, a fabric material, fabric clothing, or another fabric product. The term "fabric structure" is intended to mean a structure having warp and weft that is one of woven, non-woven, knitted, tufted, crocheted, knotted, and pressured, for example. The terms "warp" and "weft" refers to weaving terms that have their ordinary means in the textile arts, as used herein, e.g., warp refers to lengthwise or longitudinal yarns on a loom, while weft refers to crosswise or transverse yarns on a loom.

It is notable that the term "fabric substrate" does not include materials commonly known as any kind of paper (even though paper can include multiple types of natural and synthetic fibers or mixture of both types of fibers). The paper thereon is defined as the felted sheet, roll and other physical forms that are made of various plant fibers (like trees or mixture of plant fibers) with synthetic fibers by laid down on a fine screen from a water suspension. Furthermore, fabric substrates include both textiles in its filament form, in the form of fabric material, or even in the form of fabric that has been crafted into finished article (clothing, blankets, tablecloths, napkins, bedding material, curtains, carpet, shoes, etc.). In some examples, the fabric base substrate has a woven, knitted, non-woven or tufted fabric structure.

In some examples, the fabric base substrate comprises wool, cotton, silk, linen, jute, flax, hemp, rayon, corn starch, tapioca, sugarcane, polyvinyl chloride, polyester, polyamide, polyimide, polyacrylic, polyacrylic polypropylene, polyethylene, polyurethane, polystyrene, polyaramid, polytetrafluoroethylene, polyethylene terephthalate, fiberglass, polytrimethylene, polycarbonate, polyester terephthalate, polybutylene terephthalate, or a combination thereof. In some other examples, the fabric base substrate is woven, knitted, non-woven or tufted and comprises natural or synthetic fibers selected from the group consisting of wool, cotton, silk, rayon, thermoplastic aliphatic polymers, polyesters, polyamides, polyimides, polypropylene, polyethylene, polystyrene, polytetrafluoroethylene, fiberglass, polycarbonates polytrimethylene terephthalate, polyethylene terephthalate and polybutylene terephthalate. In yet some other examples, the fabric base substrate is a synthetic polyester fiber.

In some examples, the fabric base substrate (110) has a basis weight that is ranging from about 50 gsm to about 400 gsm. In some other examples, the basis weight of the fabric substrate can range from about 100 gsm to about 300 gsm.

The fabric base substrate can be a woven fabric where warp yarns and weft yarns are mutually positioned at an angle of about 90°. This woven fabric includes, but is not limited to, fabric with a plain weave structure, fabric with twill weave structure where the twill weave produces diagonal lines on a face of the fabric, or a satin weave. The fabric base substrate can be a knitted fabric with a loop structure including one or both of warp-knit fabric and weft-knit fabric. The weft-knit fabric refers to loops of one row of fabric are formed from the same yarn. The warp-knit fabric refers to every loop in the fabric structure that is formed from a separate yarn mainly introduced in a longitudinal fabric direction. The fabric base substrate can also be a non-woven product, for example a flexible fabric that includes a plurality of fibers or filaments that are one or both of bonded together and interlocked together by a chemical treatment process (e.g., a solvent treatment), a mechanical treatment process (e.g., embossing), a thermal treatment process, or a combination of two or more of these processes.

The fabric base substrate can include one or both of natural fibers and synthetic fibers. Natural fibers that may be used include, but are not limited to, wool, cotton, silk, linen, jute, flax or hemp. Additional fibers that may be used include, but are not limited to, rayon fibers, or those of thermoplastic aliphatic polymeric fibers derived from renewable resources, including, but not limited to, cornstarch, tapioca products, or sugarcanes. These additional fibers can be referred to as "natural" fibers. In some examples, the fibers used in the fabric base substrate includes a combination of two or more from the above-listed natural fibers, a combination of any of the above-listed natural fibers with another natural fiber or with synthetic fiber, a mixture of two or more from the above-listed natural fibers, or a mixture of any thereof with another natural fiber or with synthetic fiber.

The synthetic fiber that may be used in the fabric base substrate can be a polymeric fiber including, but not limited to, polyvinyl chloride (PVC) fibers, PVC-free fibers made of polyester, polyamide, polyimide, polyacrylic, polypropylene, polyethylene, polyurethane, polystyrene, polyaramid (e.g., Kevlar®) polytetrafluoroethylene (Teflon®) (both trademarks of E. I. du Pont de Nemours Company), fiberglass, polytrimethylene, polycarbonate, polyethylene terephthalate or polybutylene terephthalate. In some examples, the fibers include a combination of two or more of the above-listed polymeric fibers, a combination of any of the above-listed polymeric fibers with another polymeric fiber or with natural fiber, a mixture of two or more of the above-listed polymeric fibers, or a mixture of any of the above-listed polymeric fibers with another polymer fiber or with natural fiber. In some examples, the synthetic fiber includes modified fibers from above-listed polymers. The term "modified fibers" refers to one or both of the polymeric fiber and the fabric as a whole having underwent a chemical or physical process such as, but not limited to, one or more of a copolymerization with monomers of other polymers, a chemical grafting reaction to contact a chemical functional group with one or both the polymeric fiber and a surface of the fabric, a plasma treatment, a solvent treatment, for example acid etching, and a biological treatment, for example an enzyme treatment or antimicrobial treatment to prevent biological degradation. The term "PVC-free" means no polyvinyl chloride (PVC) polymer or vinyl chloride monomer units in the substrate.

In some examples, the fabric base substrate contains both natural fiber and synthetic polymeric fiber. The amount of synthetic polymeric fibers can represent from about 20% to about 90% of the total amount of fiber. The amount of natural fibers can represent from about 10% to about 80% of amount of fiber.

The fabric base substrate may further contain additives including, but not limited to, one or more of colorant (e.g., pigments, dyes, tints), antistatic agents, brightening agents, nucleating agents, antioxidants, UV stabilizers, fillers and lubricants, for example. Alternatively, the fabric base substrate may be pre-treated in a solution containing the substances listed above before applying the coating composition. The additives and pre-treatments are included to improve various properties of the fabric.

The Migration Control Finishing Layer

The present disclosure relates to a fabric printable medium (100), with a back-side and an image-side, comprising a fabric base substrate (110); an image-receiving coating layer (130), applied on the image-side of printable medium; a fire retarding barrier layer (140) applied to the back-side of the printable medium and, at least, a migration control finish layer (120). In one example, the migration control finish layer can be applied to the image-side only, directly on the fabric base substrate. The image-receiving coating layer will then be deposited above the migration control finish layer. The migration control finish layer is applied at a coat-weight ranging from about 0.5 to 10 gsm (gram per square meter). In another example, the migration control finish layer can be applied to the image-side and to the back-side of the media, directly on the fabric base substrate. The fire retarding barrier layer will then be deposited above the migration control finish layer on the back-side of the media.

When the migration control finish layer is applied to the image-side only, directly on the fabric base substrate, the layer is deposited on the fabric base substrate using coating technology. The migration control finish layer can be applied to the fabric base surface by any coating technology such as floating knife coater, knife over roll coater and knife over blanket coater, for examples. When coated on the fabric base substrate, the migration control finish layer will form a continuous layer on outmost surface of the fabric substrate in one example. Alternatively, the migration control finish layer will form a "semi-continuous" layer with not completely coverage on the fabric surface.

Without being bounded by any theory, it is believed that the function of the migration control finish layer is to physically block the image receiving coating composition from penetrating along the z-direction in the fabric base substrate, when it is only applied on the image receiving side of the media. When the migration control finish layer is applied on both sides of the printing media, the migration control finish layer can be functionalized as a blocking layer that prevent the composition of the fire retarding barrier layer being pushed into the fabric during coating processing. As a result of this filling effect, the different layers will form a composite and will make the fabric printing media stiffer.

When the migration control finish layer is applied to the image-side only, directly on the fabric base substrate, by coating method, the migration control finish layer will have a coat-weight ranging from about 2 to about 10 gsm. When the migration control finish layer is applied to the image-side only, directly on the fabric base substrate and below the image-receiving coating, it will have a coat-weigh ranging from about 2 to about 10 gsm, or it will have a coat-weight above 5 gsm (gram per square meter).

When the migration control finish layer is applied on both the image-side and the back-side of the fabric base substrate, the migration control finish layer will have a coat-weight ranging from about 0.5 to about 5 gsm. In some other examples, when the migration control finish layer is applied on both the image-side and on the back-side of the fabric base substrate, the migration control finish layer has a coat-weight ranging from about 1 to 2 gsm.

In some examples, the migration control finish layer comprises a film-formable polymer and a flame retardant agent. In some other examples, the migration control finish layer comprises a film-formable polymer, a flame retardant agent and a physical networking agent. The migration control finish layer comprises a film-formable polymer, a flame retardant agent and a physical networking agent when it is applied, to the image-side only, directly on the fabric base substrate and below the image-receiving coating, with a coat-weigh ranging from about 2 to about 10 gsm.

The migration control finish layer comprises a film-formable polymer. The film-formable polymer refers to a polymer, or polymeric binder, that is water-soluble or water-dispersible either in a form of emulsion by means of emulsion polymerization, or by means of a dispersant to form stable polymer particles in the aqueous solvent. The term "film-formable" refers to fact that the polymer particles, when dried out, collapse and form a thin film. Examples of film-formable polymers are, polystyrene-butadiene emulsion, acrylonitrile butadiene latex, starch, gelatin, casein, soy protein polymer, carboxy-methyl cellulose, hydroxyethyl cellulose, acrylic emulsion, vinyl acetate emulsion, vinylidene chloride emulsion, polyester emulsion, polyvinyl pyrroilidene, polyvinyl alcohol, styrene butadiene emulsions, or a combination thereof. In one example, the film-formable polymer can include starch and the starch can be an oxidized starch, cationized starch, esterified starch, enzymatically denatured starch, and combinations thereof. In another example, the film-formable polymer can be a soybean protein. In yet another example, the polymeric binder can include polyvinyl alcohol. Exemplary PVA's can include Kuraray Poval® 235, Mowiol® 6-98, Mowiol® 40-88, and Mowiol® 20-98 (all available from Kurary America Inc., Houston Tex.).

The film-formable polymer can be an acrylic type of polymer. The film-formable polymer can be selected from the group consisting of acrylonitrile-butadiene polymer, acrylic polymer and polyurethane or polyurethane-acrylic polymer.

In some examples, the film formable polymer is a commercial available acrylic polymer such as those branded as PrintRite® DP375, PrintRite® DP594, PrintRite® DP595, PrintRite® DP2003, PrintRite® DP9691, and PrintRite® DP96155 from Lubrizol. The film formable polymer can also be a polyurethane or polyurethane-acrylic hybrid film-formable polymer such as those available under the tradename Sancure® such as Sancure® 20025F or Sancure® 13094HS from Lubrizol. Without being bounded by any theory, it is believed that the film-formable polymer can provide interface function between the image receiving layers and the fabric base substrate. The film-formable polymer can also provide blocking functions to prevent the printing ink from penetrating into the z-direction of the fabric substrate so that a high ink volume can be kept on the surface of printing media to ensure a vivid image.

The average molecular weight (Mw) of the film-formable polymer can vary. In one example, the average molecular weight of the polymeric binder can range from 5,000 Mw to 200,000 Mw. In another example, the average molecular weight can vary from 10,000 Mw to about 200,000 Mw. In yet another example, the average molecular weight can vary from 20,000 Mw to 100,000 Mw. In a further example, the average molecular weight can vary from 100,000 Mw to 200,000 Mw. In one example, the film-formable polymer can have a weight average molecular weight from 5,000 Mw to 200,000 Mw and can include polystyrene-butadiene emulsion, acrylonitrile butadiene latex, starch, gelatin, casein, soy protein polymer, carboxy-methyl cellulose, hydroxyethyl cellulose, acrylic emulsion, vinyl acetate emulsion, vinylidene chloride emulsion, polyester emulsion, polyvinyl pyrrolidone, polyvinyl alcohol, styrene butadiene emulsions, or combination thereof.

The film-formable polymer can be present in an amount ranging from about 10 wt % to about 95 wt % by total weight of the migration control finish layer. In some examples, the film-formable polymers have a glass transition temperature (Tg) of which is in the range of about −20° C. to about 40° C.

The migration control finish layer comprises a flame retardant agent. The flame retardant agent can be a water-soluble or a water-dispersible flame retardant agent or filler particles with flame retardancy properties. As flame retardant agent, it is meant herein any substance that inhibits or reduces flammability or delays their combustion of the media containing it. The flame retardant agent can include a mineral powder, an organo-halogenated compound, a polymeric brominated compound, a metal and phosphorus containing composition, a phosphorus containing composition, a nitrogen containing composition, a halogen, an organophosphate, or combination thereof.

In some examples, the filler particles with flame retardancy properties can be solid particles in the room temperature having flame retardancy properties. In some other examples, the "fillers" also refers to the solid powder package that include a solid powder in the room temperature which has lower or limited flame retardancy properties in one example, or has no capability of flame retardancy properties in another example. In this case, the "filler package" or also called "filler" comprises a solid particle compounds and a flame retardant agent either in solid or liquid state in room temperature. The examples of fillers are, for example, but not limited to, an organo-halogenated compound, a polymeric brominated compound, a metal oxide and phosphorus containing composition, a phosphorus and halogen containing composition, a phosphorus continuing composition, a nitrogen containing composition, a halogen, an organophosphate, or a combination thereof. In one example, the fillers with flame retardancy properties can include a mineral compound. Exemplary mineral compounds can include aluminum hydroxide, magnesium hydroxide, huntite (magnesium calcium carbonate), hydromangesite (hydrated magnesium carbonate), phosphorus, red phosphorus, boehmite (aluminum oxide hydroxide), boron compounds, or combinations thereof. In another example, the flame retardant in filler package can include either a liquid or a solid flame retardant such as organohalogenated compound. Exemplary organohalogenated compounds can include organobromines, organochlorines, decabromodiphenyl ether, decabromodiphenyl ethane, and combinations thereof.

In yet another example, either the filler or the flame retardant agent can include a polymeric brominated compound. Exemplary polymeric brominated compounds can include brominated polystyrenes, brominated carbonate oligomers, brominated epoxy oligomers, tetrabro-mophthalic anhydride, tetrabromo-bisphenol A, hexabromocyclododecane, chlorendic acid, ethers of chlorendic acid, chlorinated paraffins, and combinations thereof. In yet another example, either the filler or the flame retardant agent can include a metal and phosphorus containing composition. Example metal and phosphorus containing compositions can include aluminum diethylphosphinate, calcium diethylphosphinate, and combinations thereof. In a further example, either the filler or the flame retardant agent can include a phosphorus and a halogen containing composition. Exemplary phosphorus and halogen containing compositions can include tris(2, 3-dibromopropyl) phosphate, chlorinated organophosphates, tris(1,3-dichloro-2-propyl) phosphate, tetrekis(2-chloroethyl) dicloro-isopentyldiphosphate, tris (1,3-dichloroisopropyl) phosphate, tris(2-chloroisopropyl) phosphate, and combinations thereof.

In some example, either the filler or the flame retardant agent can include a phosphorus containing composition. Exemplary phosphorus containing compositions can include phosphates, phosphonates, phoshpinates, and combinations thereof. In some examples, the phosphorus containing composition can have different oxidations states. In one example, the phosphorus containing composition can be a closed ring structure such as FR102® (available from Shanghai Xusen Non-Halogen Smoke Suppressing Fire Retardants Co. Ltd, China) and Aflammit® (available from Thor, Germany). In another example, the phosphorus containing composition can be a water-soluble phosphorus containing compound. Exemplary water-soluble phosphorus containing compositions can include, a phosphonate ester with one or two, closed 4 to 6 member phosphorus containing ring structures. In one example, the water-soluble phosphorus containing composition can be 5-ethyl-2-methyl-1, 3,2,-dioxaphosphoranian-5-yl)methyl dimethyl phosphonate P oxide. In another example, the water-soluble phosphorus containing composition can be bis[(-ethyl-2-methyl-1,3,2-dioxaphosphorinan-5-yl)methyl] methyl phosphonate P,P'-dioxide. In another example, either the filler or the flame retardant agent can include a nitrogen containing composition. Exemplary nitrogen containing compositions can include melamines, melamine derivatives, melamine, melamine cyanurate, melamine polyphosphate, melem (heptazine derivative), melon (heptazine derivative), and combinations.

In some examples, either the filler or the flame retardant agent can be a combination of a phosphorus containing compound, a nitrogen containing compound, and/or a halogen. In one example, the flame retardant can include a phosphorus and a nitrogen containing composition. Exemplary phosphorus and nitrogen containing compositions can include ammonium polyphosphate (APP), poly 4,4-diaminodiphenyl methane spirocyclic pentaerythritol bisphosphonate (PDSPB), 1,4-di(diethoxy thiophosphamide benzene (DTPAB), and combinations. In another example, either the filler or the flame retardant agent can include an organophosphate. The organophosphate can include aliphatic phosphate; aliphatic phosphonate; aromatic phosphonate; aliphatic organophosphate; aromatic organophosphate; polymeric organophosphate with 2 or 3 oxygen atoms attached to the central phosphorus and combinations.

In some examples, the flame retardant agents are selected from the group consisting of phosphorus-containing compounds, nitrogen-containing compounds, organophosphate compounds, alumina trihydrate and calcium carbonate. In some other examples, the flame retardant agents are selected from the group consisting of phosphorus-containing compounds, nitrogen-containing compounds, organophosphate compounds, alumina trihydrate and calcium carbonate. In yet some other examples, the flame retardant agents are selected from the group consisting of phosphorus-containing compounds and nitrogen-containing compounds. The flame retardant, either in solid state or in liquid state, can also be selected from the group consisting of phosphorus-containing compounds, nitrogen-containing compounds, organophosphate compounds, alumina trihydrate and calcium carbonate.

Examples of commercially available flame retardant agents, either in solid state or in liquid state, include FR102® (available from Shanghai Xusen Co Ltd) or Aflammit® PE and Aflammit® MSG (both available from Thor), Exolit® AP compounds (available from Clariant), solid Aflammit® powder compounds (available from Thor), Disflamoll® DPK (available from Lanxess), Phoslite B compounds (available from Italmatch Chemicals), or SpaceRite® S-3 (J.M.Huber Corp).

In some examples, the flame retardant agent is present, in the migration control finish layer (120), in an amount representing from about 5 to about 50 wt % by total weigh of the migration control finish layer. In some other examples, the flame retardant agent is present, in the migration control finish layer (120), in an amount representing from about 7 wt % to about 40 wt %, or from about 8 wt % to about 30 wt % by total weigh of the migration control finish layer.

In some examples, the migration control finish layer comprises a film-formable polymer, a flame retardant agent and a physical networking agent when it is applied, to the image-side only, directly on the fabric base substrate and below the image-receiving coating. When applied to the image-side only, directly on the fabric base substrate and below the image-receiving coating, the migration control finish layer will have a coat-weight ranging from about 2 to 10 gsm, or from about 3 to 10 gsm or from above 5 gsm.

The physical networking agent can be a chemical that promotes physical bonding with the polymeric binder to form a gel-like solution. A "gel-like solution" can have a low solids content (from about 0.1 wt % to about 30 wt %) and a high viscosity (>15,000 cps) at low shear stress (4 rpm) when measured by a Brookfield viscometer (Brookfield AMETEK, Massachusetts) at 25° C. A gel-like solution can behave like a non-flowable, semi solid gel, but is able to de-bond at higher shear forces, e.g., 100 rpms or greater, to yield a low viscosity fluid, e.g., less than 5,000 cps.

In one example, the migration control finish layer can have a solid content from 0.1 wt % to 20 wt % and a viscosity from 5,000 cps to 30,000 cps as measured at 4 rpm. In another example, the migration control finish layer can have a solid content from 5 wt % to 30 wt % and a viscosity from 3,000 cps to 15,000 cps as measured at 4 rpm.

The composite which constructs the migration control finish layer can have thixotropic behavior. As used herein, "thixotropic behavior" refers to fluids that are non-Newtonian fluids, i.e. which can show a shear stress-dependent change in viscosity. The term "non-Newtonian" refers herein to fluid having a viscosity that is dependent on an applied force such as shear or thermal forces. For example, shear thinning fluids decrease in viscosity with increasing rate of shear. The stronger the thixotropic characteristic of the chemical fluid of the water barrier layer when it undergoes shear stress, the lower the viscosity of the chemical fluid. When the shear stress is removed or reduced, the viscosity can be re-built up. Without being limited to any theory, it is believed that such thixotropic behavior reduces the penetration of the composition into the fabric substrate and helps retain the composition at the top surface of the substrate. The fluid becomes thin under shear force when applied by a coating application head (such as a blade coating head). When the fluid is deposited (the nip of the blade and shear force are removed), the viscosity of fluid can be quickly re-built up and the fluid can remain at the top surface of the treated fabric substrate.

The physical networking agents are high molecular weight polymers, i.e. having a molecular weight ranging from about 300,000 to about 1,000,000. The physical networking agents can be copolymers of acrylates, copolymers with acrylate based polyelectrolyte backbone, copolymers with polyester backbone, or copolymers with polyurethane based copolymer backbone. In some examples, the physical networking agent is selected from the group consisting of copolymers of acrylates, copolymers with acrylate based polyelectrolyte backbone, copolymers with polyester backbone, and copolymers with polyurethane based copolymer backbone.

In some other examples, the physical networking agent is a copolymer of acrylates, such as a copolymer of methacrylic acid and ethyl acrylate ester; a copolymer having with an acrylate based polyelectrolyte backbone and a weight average molecular weight from about 300,000 Mw to about 1,000,000 Mw; a copolymer having a polyester backbone and a weight average molecular weight from about 300,000 Mw to about 1,000,000 Mw; a copolymer having a polyurethane backbone and a weight average molecular weight from about 300,000 Mw to about 1,000,000 Mw; or a combination thereof. In yet some other examples, the physical networking agent can include an acrylate copolymer, a polyethylene glycol copolymer, a polyurethane copolymer, an isophorone diisocyanate, or a combination thereof and the physical networking agent can have a weight average molecular weight from 300,000 Mw to 1,000,000 Mw.

In some examples, the physical networking agents, which are part of the barrier layer, are high molecular weight copolymers of acrylates (i.e. having a molecular weight ranging from about 300,000 to about 1,000,000) such as copolymer of methacrylic acid and ethyl acrylate ester. Examples of such compounds include Acusol®810A, Acusol L®830, Acusol®835, ACUSOL® 842 (supplied by Rohm Haas/Dow Co); or Alcogum® L11, Alcogum® L12, Alcogum® L51, Alcogum® L31 and Alcogum® L52 (available from Akzo Nobel Co) and Sterocoll®FS from BASF. In some other examples, the physical networking agents of the barrier layer are high molecular weight copolymers with acrylate based polyelectrolyte backbone. Such high molecular weight copolymers with acrylate based polyelectrolyte backbone can be, for examples, acrylate acid copolymers, grafted pendant with long-chain hydrophobic groups in addition to acid groups in backbone distributed throughout the polymer chain. Examples of such polymers that are commercially available include Texicryl®13-317, Texicryl®13-313, Texicryl®13-308, and Texicryl® 13-312 (all available from Scott Bader Group). In yet some other examples, the physical networking agents of the barrier layer, are high molecular weight copolymers with polyester backbone. Such high molecular weight copolymers with polyester backbone can be, for examples, polyethylene glycol copolymers, grafted pendant with long-chain hydrophobic groups in addition to polar groups in backbone distributed throughout the polymer chain. Examples of such polymers that are commercially available include Rheovis® PE from BASF. In further examples, the physical networking agents of the barrier layer are high molecular weight copolymers with polyurethane based copolymer backbone. Such high molecular weight copolymers with polyurethane based copolymer backbone can be, for examples, as polyethylene glycol and isophorone diisocyanate, which can be end-capped with long-chain alkanol in addition to backbone distributed throughout the polymer chain. Examples of such polymers that are commercially available include Acusol®880, Acusol®882 (from Rohm Haas).

In some examples, the physical networking agent is an aqueous anionic dispersion of an ethyl acrylate-carboxylic acid copolymer such as Sterocoll®FS (available from BASF).

The Image-Receiving Layer

The fabric printable medium (100) of the present disclosure includes an image-receiving layer (130). The image-receiving layer (130), or inkjet receiving layer, will form a coating layer and is applied over the migration control finish layer (120) on the image-side of the fabric printable media. Such layer would act as the image-receiving layer since, during the printing process, the ink will be directly deposited on its surface.

In some examples, the image-receiving coating composition is applied to the migration control finish layer at a coat-weight ranging from about 0.1 to about 40 gsm (gram per square meter) or at a coat-weight ranging or from about 1 to 20 gsm (gram per square meter) or at a coat-weight ranging or from about 2 to 10 gsm (gram per square meter). In some other examples, the image-receiving coating composition is applied to the migration control finish layer at a thickness ranging from about 1 μm to about 50 μm with a dry coat-weight ranging from about 1 gsm to about 20 gsm.

The image-receiving layer (130) comprises a first crosslinked polymeric network and a second crosslinked polymeric network. The wording "polymer network" refers herein to a polymer and/or a polymer mixture which can be self-cross-linked, by reaction of different function groups in the same molecular chain, or inter-cross-linked by reaction with another compound which has different function group. In some other examples, the image-receiving layer includes a first and a second polymeric network. In yet some other examples, the image-receiving layer includes a first and a second polymeric network that are crosslinked polymeric network. The first crosslinked polymeric network and the second crosslinked polymeric network can be either different or identical by their chemical natures. The image-receiving layer can further comprise filler particles. The filler particles can be inorganic filler particles, organic particles, particles with or without flame retardancy nature, and flame-retardants.

In some examples, the first crosslinked polymeric network can be crosslinked to itself. In another example, the first crosslinked polymeric network can be crosslinked to itself and to the second crosslinked polymeric network. In one example, the second crosslinked polymeric network can be crosslinked to itself. When the first crosslinked polymeric network and the second crosslinked polymeric network are not crosslinked to one another they can be entangled or appear layered onto one another.

The first and second crosslinked polymeric networks can be present in the image-receiving layer in a variety of amounts. The first and second crosslinked polymeric networks can collectively represent from about 80 wt % to about 99 wt % of the total weight of the image-receiving layer. In another example, the first and second crosslinked polymeric networks can collectively represent from about 85 wt % to about 95 wt % of the total weight of the image-receiving layer. In a further example, the first and second crosslinked polymeric networks can collectively range from about 85 wt % to about 93 wt % of the total weight of the image-receiving layer. In some examples, the first and second crosslinked polymeric networks can be present in equal amounts. In other examples, the first and second crosslinked polymeric networks can be present in different amounts.

In some examples, in the image-receiving coating composition, the first crosslinked polymeric network and the second crosslinked polymeric network are different and independently comprises polyacrylate, polyurethane, vinylurethane, acrylic urethane, polyurethane-acrylic, polyether polyurethane, polyester polyurethane, polycaprolactam polyurethane, polyether polyurethane, alkyl epoxy resin, epoxy novolac resin, polyglycidyl resin, polyoxirane resin, polyamine, styrene maleic anhydride, a derivative thereof, or a combination thereof. The first and/or the second cross-linked polymeric networks can include a polyacrylate, polyurethane, vinyl-urethane, acrylic urethane, polyurethane-acrylic, polyether polyurethane, polyester polyurethane, polycaprolactam polyurethane, polyether polyurethane, alkyl epoxy resin, epoxy novolac resin, polyglycidyl resin, polyoxirane resin, polyamine, styrene maleic anhydride, derivative thereof, or combination thereof. In some examples, the first and second crosslinked polymeric networks can be different polymers.

In one example, the first and/or the second crosslinked polymeric network can include a polyacrylate based polymer. Exemplary polyacrylate based polymers can include polymers made by hydrophobic addition monomers include, but are not limited to, $C_1$-$C_{12}$ alkyl acrylate and methacrylate (e.g., methyl acrylate, ethyl acrylate, n-propyl acrylate, isopropyl acrylate, n-butyl acrylate, isobutyl acrylate, sec-butyl acrylate, tert-butyl acrylate, 2-ethylhexyl acrylate, octyl arylate, methyl methacrylate, ethyl methacrylate, n-propyl methacrylate, isopropyl methacrylate, n-butyl methacrylate, isobutyl methacrylate, sec-butyl methacrylate, tert-butyl methacrylate), and aromatic monomers (e.g., styrene, phenyl methacrylate, o-tolyl methacrylate, m-tolyl methacrylate, p-tolyl methacrylate, benzyl methacrylate), hydroxyl containing monomers (e.g., hydroxyethylacrylate, hydroxyethylmthacrylate), carboxylic containing monomers (e.g., acrylic acid, methacrylic acid), vinyl ester monomers (e.g., vinyl acetate, vinyl propionate, vinylbenzoate, vinylpivalate, vinyl-2-ethylhexanoate, vinylversatate), vinyl benzene monomer, $C_1$-$C_{12}$ alkyl acrylamide and methacrylamide (e.g., t-butyl acrylamide, sec-butyl acrylamide, N,N-dimethylacrylamide), crosslinking monomers (e.g., divinyl benzene, ethyleneglycoldimethacrylate, bis(acryloylamido) methylene), and combinations thereof. Polymers made from the polymerization and/or copolymerization of alkyl acrylate, alkyl methacrylate, vinyl esters, and styrene derivatives may also be useful. In one example, the polyacrylate based polymer can include polymers having a glass transition temperature greater than 20° C. In another example, the polyacrylate based polymer can include polymers having a glass transition temperature of greater than 40° C. In yet another example, the polyacrylate based polymer can include polymers having a glass transition temperature of greater than 50° C.

In some examples, the first and/or the second crosslinked polymeric network can be formed by using self-cross-linked polyurethane polymers or cross-linkable polyglycidyl or polyoxirane resins. In some other examples, the first and/or second crosslinked polymeric network can be formed by using self-cross-linked polyurethane polymers. The self-cross-linked polyurethane polymer can be formed by reacting an isocyanate with a polyol. Exemplary isocyanates used to form the polyurethane polymer can include toluenediisocyanate, 1,6-hexamethylenediisocyanate, diphenylmethane-diisocyanate, 1,3-bis(isocyanatemethyl)cyclohexane, 1,4-cyclohexyldiisocyanate, p-phenylenediisocyanate, 2,2,4(2, 4,4)-trimethylhexamethylenediisocyanate, 4,4'-dicychlohexylmethanediisocyanate, 3,3'-dimethyldiphenyl, 4,4'-diisocyanate, m-xylenediisocyanate, tetramethylxylene-diisocyanate, 1,5-naphthalenediisocyanate, dimethyl-triphenyl-methane-tetra-isocyanate, triphenyl-methane-tri-isocyanate, tris(iso-cyanate-phenyl)thiophosphate, and combinations thereof. Commercially available isocyanates can include Rhodocoat® WT 2102 (available from Rhodia AG, Germany), Basonat® LR 8878 (available from BASF Corporation, N. America), Desmodur® DA, and Bayhydur® 3100 (Desmodur® and Bayhydur® are available from Bayer AG, Germany). In some examples, the isocyanate can be protected from water. Exemplary polyols can include 1,4-butanediol; 1,3-propanediol; 1,2-ethanediol; 1,2-propanediol; 1,6-hexanediol; 2-methyl-1,3-propanediol; 2,2-dimethyl-1,3-propanediol; neopentyl glycol; cyclo-hexane-dimethanol; 1,2,3-propanetriol; 2-ethyl-2-hydroxymethyl-1, 3-propanediol; and combinations thereof. In some examples, the isocyanate and the polyol can have less than three functional end groups per molecule. In another example, the isocyanate and the polyol can have less than five functional end groups per molecule. In yet another example, the polyurethane can be formed from a polyisocyanate having at least two isocyanate functionalities and a polyol having at least two hydroxyl or amine groups. Exemplary poly-isocyanates can include diisocyanate monomers and oligomers. The self-cross-linked polyurethane polymer can also be formed by reacting an isocyanate with a polyol, where both isocyanates and polyols have average less than three end functional groups per molecule so that the polymeric network is based on a liner polymeric chain structure.

The polyurethane chain can have a trimethyloxysiloxane group and cross-link action can take place by hydrolysis of the function group to form silsesquioxane structure. The polyurethane chain can also have an acrylic function group, and the cross-link structure can be formed by nucleophilic addition to acrylate group through aceto-acetoxy functionality. In some other examples, the first and/or second cross-linked polymeric network is formed by using vinyl-urethane hybrid copolymers or acrylic-urethane hybrid polymers. In yet some other examples, the polymeric network includes an aliphatic polyurethane-acrylic hybrid polymer. Representative commercially available examples of the chemicals which can form a polymeric network include, but are not limited to, NeoPac®R-9000, R-9699 and R-9030 (from Zeneca Resins), Sancure®AU4010 (from Lubrizol) and Hybridur®570 (from Air Products).

In one example, the weight average molecular weight of the polyurethane polymer used in the first and/or second crosslinked polymer can range from about 20,000 Mw to about 200,000 Mw as measured by gel permeation chromatography. In another example, the weight average molecular weight of the polyurethane polymer can range from about 40,000 Mw to about 180,000 Mw as measured by gel permeation chromatography. In yet another example, the weight average molecular weight of the polyurethane polymer can range from about 60,000 Mw to about 140,000 Mw as measured by gel permeation chromatography.

Exemplary polyurethane polymers can include polyester based polyurethanes, U910, U938 U2101 and U420; polyether based polyurethane, U205, U410, U500 and U400N; polycarbonate based polyurethanes, U930, U933, U915 and U911; castor oil based polyurethane, CUR21, CUR69, CUR99 and CUR991; and combinations thereof. (These polyurethanes are available from Alberdingk Boley Inc., North Carolina, USA).

The polymeric network (the first and/or second) can include a polymeric core that is, at least, one polyurethane. The polyurethanes include aliphatic as well as aromatic polyurethanes. The polyurethane is typically the reaction products of the following components: a polyisocyanate having at least two isocyanate functionalities (—NCO) per molecule with, at least, one isocyanate reactive group such as a polyol having at least two hydroxy groups or an amine.

Suitable poly-isocyanates include diisocyanate monomers, and oligomers. Examples of polyurethanes include aromatic polyether polyurethanes, aliphatic polyether polyurethanes, aromatic polyester polyurethanes, aliphatic polyester polyurethanes, aromatic polycaprolactam polyurethanes, and aliphatic polycaprolactam polyurethanes. In some other, the polyurethanes are aromatic polyether polyurethanes, aliphatic polyether polyurethanes, aromatic polyester polyurethanes, and aliphatic polyester polyurethanes. Representative commercially available examples of polyurethanes include Sancure®2710 and/or Avalure®UR445 (which are equivalent copolymers of polypropylene glycol, isophorone diisocyanate, and 2,2-dimethylolpropionic acid, having the International Nomenclature Cosmetic Ingredient name "PPG-17/PPG-34/IPDI/DMPA Copolymer"), Sancure®878, Sancure®815, Sancure®1301, Sancure®2715, Sancure®2026, Sancure®1818, Sancure®853, Sancure®830, Sancure®825, Sancure®776, Sancure®850, Sancure®12140, Sancure®12619, Sancure®835, Sancure®843, Sancure®898, Sancure®899, Sancure®1511, Sancure®1514, Sancure®1517®, Sancure®1591, Sancure®2255, Sancure®2260, Sancure®2310, Sancure®2725, and Sancure®2016 (all commercially available from Lubrizol Inc.).

Other examples of commercially-available polyurethanes can include NeoPac® R-9000, R-9699, and R-9030 (available from Zeneca Resins, Ohio), Printrite® DP376 and Sancure® AU4010 (available from Lubrizol Advanced Materials, Inc., Ohio), and Hybridur® 570 (available from Air Products and Chemicals Inc., Pennsylvania).

In some example, the polymeric network is created by using cross-linkable polyglycidyl or polyoxirane resins. Cross-link reaction can take place either with themselves (through catalytic homopolymerisation of oxirane function group) or with the help of a wide range of co-reactants including polyfunctional amines, acids, acid anhydrides, phenols, alcohols, and thiols. Both polyglycidyl resin and co-reactants are compatible with the chemicals that form a polymeric network before curing in liquid state. The term "compatible" refers here to the fact that there is no significant phase separation after mixing in the room temperature.

In some examples, the first and/or the second polymeric network comprises epoxy-functional additives. Epoxy-functional additives can include alkyl and aromatic epoxy resins or epoxy-functional resins, such as for example, epoxy novolac resin(s) and other epoxy resin derivatives. Epoxy-functional molecules can include at least one, or two or more pendant epoxy moieties. The molecules can be aliphatic or aromatic, linear, branched, cyclic or acyclic. If cyclic structures are present, they may be linked to other cyclic structures by single bonds, linking moieties, bridge structures, pyro moieties, and the like. Examples of suitable epoxy functional resins are commercially available and include, without limitation, Ancarez®AR555 (commercially available from Air Products), Ancarez®AR550, Epi-rez®3510W60, Epi-rez®3515W6, or Epi-rez®3522W60 (commercially available from Hexion).

In some other examples, the polymeric network includes epoxy resin. Examples of suitable aqueous dispersions of epoxy resin include Waterpoxy®1422 (commercially available from Cognis) or Ancarez®AR555 1422 (commercially available from Air Products). The polymeric network can comprise epoxy resin hardeners. The examples of epoxy resin hardeners that can be used herein include liquid aliphatic or cycloaliphatic amine hardeners of various molecular weights, in 100% solids or in emulsion or water and solvent solution forms. Amine adducts with alcohols and phenols or emulsifiers can also be envisioned. Examples of suitable commercially available hardeners include Anquawhite® 100 (from Air Products) and EN-CURE® 8290-Y-60 (from Hexion). The polymeric network can include water-based polyamine as epoxy resin hardeners. Such epoxy resin hardeners can be, for examples, water-based polyfunctional amines, acids, acid anhydrides, phenols, alcohols and/or thiols. Other examples of commercially available polymeric networks that can be used herein includes the ingredients Araldite® PZ 3921 and/or Aradur® 3985 available from Huntsman.

In some examples, the image-receiving layer includes a first and/or second polymeric network that is a hybrid network created by using self-cross-linked polyurethane polymers and by using cross-linkable polyglycidyl or polyoxirane resins. In some other examples, the image-receiving layer comprises a polymeric network that is created by using vinyl-urethane hybrid copolymers or acrylic-urethane hybrid polymers and water-based epoxy resins and water-based polyamines. In a further example, the first and/or second crosslinked polymeric network can include a styrene maleic anhydride (SMA). In one example, the SMA can include NovaCote 2000® (Georgia-Pacific Chemicals LLC, Georgia). In another example, the styrene maleic anhydride can be combined with an amine terminated polyethylene oxide (PEO); amine terminated polypropylene oxide (PPO), copolymer thereof, or a combination thereof. In one example, combining a styrene maleic anhydride with an amine terminated PEO and/or PPO can strengthen the polymeric network by crosslinking the acid carboxylate functionalities of the SMA to the amine moieties on the amine terminated PEO and/or PPO. The amine terminated PEO and/or PPO, in one example, can include amine moieties at one or both ends of the PEO and/or PPO chain, and/or as branched side chains on the PEO and/or PPO. In one example, utilizing an amine terminated PEO and/or PPO in combination with a SMA can allow for the user to retain the glossy features of the SMA while eliminating the brittle nature of SMA. Exemplary commercially available amine terminated PEO and/or PPO compounds can include Jeffamine® XTJ-500, Jeffamine® XTJ-502, and Jeffamine® XTJ D-2000 (all available from Huntsman International LLC, Texas). In some examples, a weight ratio of SMA to the amine terminated PEO and/or PPO can range from about 100:1 to about 2.5:1. In another, a weight ratio of the SMA to the amine terminated PEO and/or PPO can range from about 90:1 to about 10:1. In yet another example, a weight ratio of the SMA to the amine terminated PEO and/or PPO can range from about 75:1 to about 25:1.

In some examples, the image-receiving layer might further comprise filler particles. Such filler includes inorganic compounds, organic compounds, compounds with flame retardancy nature, and flame-retardant agents. In some examples, the amount of filler compound, in the image-receiving layer, can be within the range of about 1 to about 70 wt % or within the range of about 5 to about 60 wt % or within the range of about 10 to about 50 wt % by total weight of the image-receiving layer. In some examples, the image-receiving layer contains filler particles that have a nature of flame retardancy (or flame retardancy properties) or contains fillers and, separately, a flame-retardant agent. The fillers that have a nature of flame retardancy or flame retardancy properties can be considered as flame-retardant agents. As flame-retardant agent, it is meant herein any substance that inhibits or reduces flammability or delays their combustion of the media containing it. The filler particles can be the same, or different, as the one used in the barrier layer composition as described below.

The Fire Retarding Barrier Layer

The fabric printable medium of the present disclosure comprises a fabric base substrate (110); a migration control finish layer (120), an image-receiving coating composition (130) and fire retarding barrier layer (140). The fire retarding barrier layer (140) is applied directly on the fabric base substrate, or over the migration control finish layer (120) when present on the back-side of the media (102). By "fire retarding", it is meant herein that the layer has the ability to inhibits or reduces flammability or delays their combustion of the media containing it.

In one example, the fire retarding barrier layer (140) can be applied to the fabric base substrate at a dry coat-weight ranging from about 1 gsm to about 50 gsm per side. In one other example, the fire retarding barrier layer (140) is applied, to the fabric substrate, at a dry coat-weight ranging from about 10 gsm to about 20 gsm.

The fire retarding barrier layer composition includes a polymeric binder and filler particles with flame retardancy properties. Other functional additives can be added to the backing coating composition, for specific property control such as, for examples, surfactant for wettability, and processing control agent such as deformer, and PH control base/acid buffer.

The fire retarding barrier layer composition contains a polymeric binder. Without being linked by any theory, it is believed that the polymeric binder can provide binding function to the fillers to form a continuous layer and adhesion function between coating layers and the fabric substrate. The polymeric binder can be present, in the barrier coating composition, in an amount ranging from about 10 wt % to about 70 wt % by total weigh of the barrier coating composition. The polymeric binder can be either water a soluble, a synthetic or a natural substance or an aqueous dispersible substance like polymeric latex. In some other examples, the polymeric binder is polymeric latex. The polymeric binder can be a water-soluble polymer or water dispersible polymeric latex. In some examples, the polymeric binder has a glass transition temperature (Tg) that is less than 5° C. Indeed, it is believed that polymeric binder with higher glass transition temperature (Tg) might contribute to a stiff coating and can damage the fabric "hand feeling" of the printing media. In some examples, the polymeric binders have a glass transition temperature (Tg) ranging from −40° C. to 0° C. In some other examples, the polymeric binders have a glass transition temperature (Tg) ranging from −20° C. to −5° C. The way of measuring the glass transition temperature (Tg) parameter is described in, for example, Polymer Handbook, 3rd Edition, authored by J. Brandrup, edited by E. H. Immergut, Wiley-Interscience, 1989.

In some examples, the polymeric binders are crossed-linked binder. "Crossed-linked binder" refers to the fact that multiple polymer substances with reactive function groups can react with each other to form a between-molecular chain structure, a cross linker, a macro-molecular substance or a low molecular weight chemical with more than two function groups that can be used. Binders with "self-crosslink" capability can mean that macro-molecular chains have different reactive function groups that can be used. The cross-linked binders can balance both softness and mechanical strength of the coating layers. Suitable polymeric binders include, but are not limited to, water-soluble polymers such as polyvinyl alcohol, starch derivatives, gelatin, cellulose derivatives, acrylamide polymers, and water dispersible polymers such as acrylic polymers or copolymers, vinyl acetate latex, polyesters, vinylidene chloride latex, styrene-butadiene or acrylonitrile-butadiene copolymers. Non-limitative examples of suitable binders include styrene butadiene copolymer, polyacrylates, polyvinylacetates, polyacrylic acids, polyesters, polyvinyl alcohol, polystyrene, polymethacrylates, polyacrylic esters, polymethacrylic esters, polyurethanes, copolymers thereof, and combinations thereof. In some examples, the binder is a polymer or a copolymer selected from the group consisting of acrylic polymers or copolymers, vinyl acetate polymers or copolymers, polyester polymers or copolymers, vinylidene chloride polymers or copolymers, butadiene polymers or copolymers, styrene-butadiene polymers or copolymers and acrylonitrile-butadiene polymers or copolymers. In a further example, the polymeric binder can include an acrylonitrile-butadiene latex.

In some other examples, the binder component is a latex containing particles of a vinyl acetate-based polymer, an acrylic polymer, a styrene polymer, an SBR-based polymer, a polyester-based polymer, a vinyl chloride-based polymer, or the like. In yet some other examples, the binder is a polymer or a copolymer selected from the group consisting of acrylic polymers, vinyl-acrylic copolymers and acrylic-polyurethane copolymers. Such binders can be polyvinylalcohol or copolymer of vinylpyrrolidone. The copolymer of vinylpyrrolidone can include various other copolymerized monomers, such as methyl acrylates, methyl methacrylate, ethyl acrylate, hydroxyethyl acrylate, hydroxyethyl methacrylate, ethylene, vinylacetates, vinylimidazole, vinylpyridine, vinylcaprolactams, methyl vinylether, maleic anhydride, vinylamides, vinylchloride, vinylidene chloride, dimethylaminoethyl methacrylate, acrylamide, methacrylamide, acrylonitrile, styrene, acrylic acid, sodium vinylsulfonate, vinylpropionate, and methyl vinylketone, etc. Examples of binders include, but are not limited to, polyvinyl alcohols and water-soluble copolymers thereof, e.g., copolymers of polyvinyl alcohol and poly(ethylene oxide) or copolymers of polyvinyl alcohol and polyvinylamine; cationic polyvinyl alcohols; aceto-acetylated polyvinyl alcohols; polyvinyl acetates; polyvinyl pyrrolidones including copolymers of polyvinyl pyrrolidone and polyvinyl acetate; gelatin; silyl-modified polyvinyl alcohol; styrene-butadiene copolymer; acrylic polymer latexes; ethylene-vinyl acetate copolymers; polyurethane resin; polyester resin; and combination thereof. In some examples, the binder is carboxylated styrene-butadiene copolymer binder. Such binder can be find commercially under the tradename Genflow® and Acrygen® from Omnova Solutions.

In one example, the polymeric binder may have an average molecular weight (Mw) of about 5,000 to about 200,000. In another example, the average molecular weight of the polymeric binder can vary from 10,000 Mw to about 200,000 Mw. In yet another example, the average molecular weight of the polymeric binder can vary from 20,000 Mw to 100,000 Mw. In a further example, the average molecular weight of the polymeric binder can vary from 100,000 Mw to 200,000 Mw. In one example, the polymeric binder can have a weight average molecular weight from 5,000 Mw to 200,000 Mw and can include polystyrene-butadiene emulsion, acrylonitrile butadiene latex, starch, gelatin, casein, soy protein polymer, carboxy-methyl cellulose, hydroxyethyl cellulose, acrylic emulsion, vinyl acetate emulsion, vinylidene chloride emulsion, polyester emulsion, polyvinyl pyrroilidene, polyvinyl alcohol, styrene butadiene emulsions, or combination thereof. In some examples, the polymeric binder is a self-crosslinking aqueous acrylic dispersion such an Edolan® AB available from Tanatex Chemicals (having a solids content of 45% and Tg of −18° C.).

The fire retarding barrier layer (140) contains a polymeric binder and filler particles with flame retardance function. In some examples, the fire retarding barrier layer composition contains filler particles that have a nature of flame retardancy (or flame retardancy properties) or contains fillers and, separately, a flame-retardant agent. The fillers that have a nature of flame retardancy or flame retardancy properties can be considered as flame-retardant agents. As flame-retardant agent, it is meant herein any substance that inhibits or reduces flammability or delays their combustion of the media containing it. In some examples, the filler or filler package or filler particles with flame retardancy properties or flame-retardant agent is present, in the fire retarding barrier layer, in an amount representing from about 10 to about 90 wt % by total weigh of the fire retarding barrier layer composition.

In some examples, the "fillers" can be solid particles in the room temperature having flame retardancy properties. In some other examples, the "fillers" also refers to the solid powder package that include a solid powder in the room temperature which has lower or limited flame retardancy properties in one example, or has no capability of flame retardancy properties in another example. In this case, the "filler package" or also called "filler", comprises a solid particle compounds and a flame-retardant agent either in solid or liquid state in room temperature. The examples of fillers are, for example, but not limited to, an organo-halogenated compound, a polymeric brominated compound, a metal oxide and phosphorus containing composition, a phosphorus and halogen containing composition, a phosphorus continuing composition, a nitrogen containing composition, a halogen, an organophosphate, or a combination thereof.

The fillers present in the fire retarding barrier layer (140) can be similar or different to the fillers with flame retardancy properties, or flame-retardant agents, that are present in the migration control finish layer (120) and that are described above.

Method for Forming a Fabric Printable Medium

The fabric printable medium is prepared by using several surface treatment compositions herein named a coating layer or coating composition. In some examples, as illustrated in FIG. 3, the method (200) for forming the fabric printable medium encompasses: providing (210) a fabric base substrate with an image-side and a back-side (i.e. with a first and a second side); applying (220) a migration control finish layer, comprising a film-formable polymer and a flame retardant agent, on at least one side of the fabric base substrate at a coat-weight ranging from about 0.5 to 10 gsm; applying (230) an image-receiving coating layer comprising a first and a second crosslinked polymeric network, over the migration control finish layer on the image of the fabric base substrate; and applying (240) a fire retarding barrier layer, comprising polymeric binders and filler particles with flame retardancy properties, on the back-side of the fabric base substrate and then obtaining (250) the fabric printable medium.

In some examples, the migration control finish layer (120) further comprises a physical networking agent when it is applied only on the image-side (101) of the fabric base substrate (101), below the image-receiving coating. When applied only on the image-side, it will be applied at a coat-weight ranging from about 2 to about 10 gsm, or at a coat-weight ranging from about 2 to 10 gsm. The thickness of the finishing layer, when it forms continuous layer may be about 0.5-5 micrometers depending on the composition of the finishing solution. The finishing can be applied on the surface by any coating technology known in the arts such as rod coater and blend coater.

In some examples, the migration control finish layer is applied on both the image-side and on the back-side of the fabric base substrate, with coating technique, at a coat-weight ranging from about 0.5 to 5 gsm. In some other examples, the migration control finish layer further comprises a physical networking agent and is applied only on the image-side of the fabric base substrate, below the image-receiving coating, applied by padding coating, at a coat-weigh ranging from about 2 to about 10 gsm.

The application of the image-receiving coating layer, the fire retarding barrier layer and of the migration control finish layer that further comprises a physical networking agent can be done by any coating process and can include a floating knife process, a knife on roll mechanism process, or a transfer coating process. The floating knife process can include stretching the fabric to form an even uniform surface. The floating knife process can further include transporting the fabric under a stationary knife blade. In some examples, the step of applying the coating layers can include applying a foam coating. The foam coating can be applied using a knife-on-the roll mechanism. The knife-on-the roll mechanism can be followed by passing the fabric through calendaring pressure nips. The calendaring can be done either in room temperature or at an elevated temperature and/or pressure. The elevated temperature can range from 40° C. to 100° C. The elevated pressure can range from about 100 psi to about 5,000 psi. In some other examples, the coating process can include transferring the coating composition. When the coating composition is transferred, the coating can be spread onto a release substrate to form a film. The film can then be laminated onto the fabric.

In some examples, the migration control finish layer (120) is applied on both the image-side (101) and on the back-side (102) of the fabric base substrate (110) at a coat-weight ranging from about 0.5 to 5 gsm or from about 1 to 2 gsm. When applied to both side of the fabric base substrate, the application can be carried out using padding procedures. The fabric substrate can be soaked in a bath and the excess can be rolled out. More specifically, impregnated fabric substrates (prepared by bath, spraying, dipping, etc.) can be passed through padding nip rolls under pressure. The impregnated fabric, after nip rolling, can then be dried under heat at any functional time which is controlled by machine speed with peak fabric web temperature in the range of about 90° C. to about 180° C. In some examples, pressure can be applied to the fabric substrate after impregnating the fabric base substrate with the coating composition. In some other examples, the surface treatment is accomplished in a pressure padding operation. During such operation, the fabric base substrate is firstly dipped into a pan containing treatment coating composition and is then passed through the gap of padding rolls. The padding rolls (a pair of two soft rubber rolls or a metal chromic metal hard roll and a tough-rubber synthetic soft roll for instance), apply the pressure to composite-wetted textile material so that composite amount can be accurately controlled. In some examples, the pressure, that is applied, is between about 10 and about 150 PSI or, in some other examples, is between about 30 to about 70 PSI.

The migration control finish layer (120) can be dried using box hot air dryer. The dryer can be a single unit or could be in a serial of 3 to 7 units so that a temperature profile can be created with initial higher temperature (to remove excessive water) and mild temperature in end units (to ensure completely drying with a final moisture level of less than 1-5% for example). The peak dryer temperature can be programmed into a profile with higher temperature at begging of the drying when wet moisture is high and reduced to lower temperature when web becoming dry. The dryer temperature is controlled to a temperature of less than about 200° C. to avoid yellowing textile, and the fabric web temperature is controlled in the range of about 90 to about 180° C. In some examples, the operation speed of the padding/drying line is 50 yards per minute.

Printing Method

Once the coating composition is applied to the fabric base substrate and appropriately dried, ink compositions can be applied by any processes onto the fabric printable medium. In some examples, the ink composition is applied to the fabric printable medium via inkjet printing techniques. As illustrated in FIG. 4, the printing method (300) encompasses obtaining (310) a fabric printable medium comprising a fabric base substrate; an image-receiving coating layer, applied on the image-side of printable medium, comprising a first and a second crosslinked polymeric network; a fire retarding barrier layer, applied to the back-side of the printable medium comprising polymeric binders and filler particles with flame retardancy properties; and, at least, a migration control finish layer comprising a film-formable polymer and a flame retardant agent, at a coat-weight ranging from about 0.5 to 10 gsm; and, then, applying (320) an ink composition onto said fabric printable medium to form a printed image. Said printed image will have, for instance, enhanced image quality and image permanence. In some examples, when needed, the printed image can be dried using any drying device attached to a printer such as, for instance, an IR heater.

In some examples, the ink composition is an inkjet ink composition that contains one or more colorants that impart the desired color to the printed message and a liquid vehicle. As used herein, "colorant" includes dyes, pigments, and/or other particulates that may be suspended or dissolved in an ink vehicle. The colorant can be present in the ink composition in an amount required to produce the desired contrast and readability. In some examples, the ink compositions include pigments as colorants. Pigments that can be used include self-dispersed pigments and non-self-dispersed pigments. Any pigment can be used; suitable pigments include black pigments, white pigments, cyan pigments, magenta pigments, yellow pigments, or the like. Pigments can be organic or inorganic particles as well known in the art. As used herein, "liquid vehicle" is defined to include any liquid composition that is used to carry colorants, including pigments, to a substrate. A wide variety of liquid vehicle components may be used and include, as examples, water or any kind of solvents.

In some other examples, the ink composition, applied to the fabric printable medium, is an ink composition containing latex components. Latex components are, for examples, polymeric latex particulates. The ink composition may contain polymeric latex particulates in an amount representing from about 0.5 wt % to about 15 wt % based on the total weight of the ink composition. The polymeric latex refers herein to a stable dispersion of polymeric micro-particles dispersed in the aqueous vehicle of the ink. The polymeric latex can be natural latex or synthetic latex. Synthetic latexes are usually produced by emulsion polymerization using a variety of initiators, surfactants and monomers. In various examples, the polymeric latex can be cationic, anionic, nonionic, or amphoteric polymeric latex. Monomers that are often used to make synthetic latexes include ethyl acrylate; ethyl methacrylate; benzyl acrylate; benzyl methacrylate; propyl acrylate; methyl methacrylate, propyl methacrylate; iso-propyl acrylate; iso-propyl methacrylate; butyl acrylate; butyl methacrylate; hexyl acrylate; hexyl methacrylate; octadecyl methacrylate; octadecyl acrylate; lauryl methacrylate; lauryl acrylate; hydroxyethyl acrylate; hydroxyethyl methacrylate; hydroxyhexyl acrylate; hydroxyhexyl methacrylate; hydroxyoctadecyl acrylate; hydroxyoctadecyl methacrylate; hydroxylauryl methacrylate; hydroxylauryl acrylate; phenethyl acrylate; phenethyl methacrylate; 6-phenylhexyl acrylate; 6-phenylhexyl methacrylate; phenyllauryl acrylate; phenyllauryl methacrylate; 3-nitrophenyl-6-hexyl methacrylate; 3-nitrophenyl-18-octadecyl acrylate; ethyleneglycol dicyclopentyl ether acrylate; vinyl ethyl ketone; vinyl propyl ketone; vinyl hexyl ketone; vinyl octyl ketone; vinyl butyl ketone; cyclohexyl acrylate; methoxysilane; acryloxypropyhiethyldimethoxysilane; trifluoromethyl styrene; trifluoromethyl acrylate; trifluoromethyl methacrylate; tetrafluoropropyl acrylate; tetrafluoropropyl methacrylate; heptafluorobutyl methacrylate; butyl acrylate; iso-butyl methacrylate; 2-ethylhexyl acrylate; 2-ethylhexyl methacrylate; isooctyl acrylate; and iso-octyl methacrylate.

In some examples, the latexes are prepared by latex emulsion polymerization and have an average molecular weight ranging from about 10,000 Mw to about 5,000,000 Mw. The polymeric latex can be selected from the group consisting of acrylic polymers or copolymers, vinyl acetate polymers or copolymers, polyester polymers or copolymers, vinylidene chloride polymers or copolymers, butadiene polymers or copolymers, polystyrene polymers or copolymers, styrene-butadiene polymers or copolymers and acrylonitrile-butadiene polymers or copolymers. The latex components are on the form of a polymeric latex liquid suspension. Such polymeric latex liquid suspension can contain a liquid (such as water and/or other liquids) and polymeric latex particulates having a size ranging from about 20 nm to about 500 nm or ranging from about 100 nm to about 300 nm.

EXAMPLES

The raw materials and chemical components used in the illustrating samples are listed in the Table 1 below.

TABLE 1

| Ingredients | Nature of the ingredients | Supplier |
| --- | --- | --- |
| PrintRite ® DP375 | water-dispersible film forming polymer | Lubrizol |
| Aflammit ® MSG | Non-halogenated flame retardant agent | Thor |
| Sterocoll ® FS | Physical networking agent | BASF |
| Byk-Dynwet ® 800 | silicone-free surfactant | BYK Inc. |
| Araldite ® PZ 3901 | Cross-linked polymeric network | Hundtsman Inc. |
| Aradur ® 3985 | Cross-linked polymeric network | Hundtsman Inc. |
| Sancure ® 2016 | Polyurethane polymer | Lubrizol Inc. |
| Sancure ® 4010 | Self-Crosslinking aliphatic polyurethane-acrylic network | Lubrizol Inc. |

TABLE 1-continued

| Ingredients | Nature of the ingredients | Supplier |
|---|---|---|
| Firmaster ® FM2100R | Fire retardant agent | Great Lake Solution Inc. |
| AN602 | Fire retardant agent (Antimony Trioxide) | TriTrust Industrial |
| Arosol ® OT75 | Dispersant for Fire retardant agent | Cytec Solvay |
| Foamaster ® MO2185 | De-foamer | BASF Co. |
| Exolit ® AP 423 | Fire retardant agent | Clariant Co |
| Genflow ® 3792 | Carboxylated styrene-butadiene copolymer binder | Omnova Solutions |
| JLS PNP1-C | Phosphorus-nitrogen based flame retardant | JLS chemical |

Example 1—Preparation of Printable Medium Samples

The illustrating Samples 1 to 4 are fabric printable mediums in accordance with the principles described herein. Samples 5 and 6 are comparative examples. Detailed structures of these samples are shown in Table 2.

TABLE 2

| Samples | migration control finish layer—MC | Image receiving coating layer—IR | Fire retarding layer—FR |
|---|---|---|---|
| Sample 1 | MC-A (5 gsm only on image side) | IR-A (10 gsm) | FR-A (15 gsm) |
| Sample 2 | MC-B (1.5 gsm on back-side and image side) | IR-A (10 gsm) | FR-A (15 gsm) |
| Sample 3 | MC-B (1.5 gsm on back-side and image side) | IR-B (10 gsm) | FR-A (15 gsm) |
| Sample 4 | MC-B (1.5 gsm on back-side and image side) | IR-B (10 gsm) | FR-B (15 gsm) |
| Sample 5 Comparative | None | IR-A (10 gsm) | FR-A (15 gsm) |
| Sample 6 Comparative | MC-B (1.5 gsm on back-side and image side) | IR-B (10 gsm) | None |

Each sample has a support base structure (110) which is a polyester fabric with plain weave having a weight of 130 gsm. Each samples of the present disclosure comprises, at least, a migration control finish layer, an image-receiving coating layer and a fire retarding barrier layer. The different formulations of the different layers are summarized in Tables 3, 4 and 5. Each number represents the Parts (by dry weight) contained in each layer composition.

The Migration control finishing layer formulation MC-A, all image receiving layers (IR A and B) and Fire retarding barrier layer (FR A and B) are applied by a Methis lab-coater equipped with an IR dryer. Blade that is used is a 90-degree flat blade. The Migration control finishing layer formulation MC-A is applied only to the image-side of the fabric printable medium at a coat-weight of about 5 gsm.

The Migration control finishing layer formulation MC-B is applied by using a Mathis lab padder machine equipped with a IR dryer (as supplied by Methis Inc, Germany). The padding pressure is 50 PSI, speed setting is 0.25, and dryer temperature is 100° C., 120° C. and 90° C. for each zone. The Migration control finishing layer formulation MC-B is applied to both the image-side and the back-side of the fabric printable medium, at a coat-weight of about 1.5 gsm.

TABLE 3

| Migration control layer—MC - (120) | | |
|---|---|---|
| Chemical | MC - A | MC - B |
| PrintRite ® DP375 | 10 | 10 |
| Afflammit ® MSG | 60 | 60 |
| Sterocal ® FS | 1.2 | — |

TABLE 4

| Image receiving layer—IR - (130) | | |
|---|---|---|
| Chemical | IR - A | IR - B |
| Byk-Dynwet ® 800 | 0.8 | 0.8 |
| Araldite ® PZ 3901 | 5 | 5 |
| Aradur ® 3985 | 5 | 5 |
| Sancure ® 2016 | 6 | 6 |
| Sancure ® 4010 | 5 | 5 |
| Firmaster ® FM2100R | 11 | — |
| Brightsun ® | 5 | — |
| Arosol ® OT75 | 0.6 | — |
| Foamaster ® | 0.6 | — |
| Exolit ® AP 423 | — | 30 |

TABLE 5

| Fire retarding barrier layer—FR - (140) | | |
|---|---|---|
| Chemical | FR - A | FR - B |
| Byk-Dynwet ® 800 | 0.8 | 1.2 |
| Genflow ® 3792 | 50 | 50 |
| Firmaster ® FM2100R | 36 | — |
| AN602 | 18 | — |
| Arosol ® OT75 | 2 | — |
| Foamaster ® | 1 | 0.6 |
| JSL PNP1-C | — | 60 |

Example 2—Samples Performances

The same images are printed on the experimental Samples 1, 2, 3 and 4 and comparison Samples 5 and 6 using a HP® Latex L360 Printer equipped with HP 789 ink cartridge (HP Inc.). The printer is set with a heating zone temperature at about 50° C., a cure zone temperature at about 110° C., and an air flow at about 15%. The printed fabric mediums are evaluated for different performances: image quality, image durability and Fire resistance. The results of these tests are expressed in the Table 6 below.

Image quality is evaluated using both numeric measurement method and visual evaluation method. The image quality of the prints is measured with Gamut, Ink bleed, Ink strike through and image gloss test. The Ink bleed and Ink strike through are evaluated visually from the printed samples using a scale of 1-5 (with 1 being the worst and 5 being the best). Gamut Measurement represents the amount of color space covered by the ink on the media sample (a measure of color richness). The gamut is measured on Macbeth®TD904 (Micro Precision Test Equipment, California) (A higher value indicates better color richness). The image gloss is evaluated using spectrophotometer (such as the X-Rite i1/i0) and single-angle gloss-meter (such as the BYK Gloss-meter).

Image Durability is with rub resistance, coin scratch and ink transfer tests. Rub resistance testing is carried out using an abrasion scrub tester (per ASTM D4828 method): fabrics are printed with small patches of all available colors (cyan, magenta, yellow, black, green, red, and blue). A weight of 250 g is loaded on the test header. The test tip is made of acrylic resin with crock cloth. The test cycle speed is 25 cm/min and 5 cycles are carried out for each sample at an 8 inch length for each cycle. The test probe is in dry (dry rub) or wet (wet rub) mode. Coin scratch test is performed by exposing the various samples to be tested to a 45 degree coin scratching under a normal force of 800 g. The test is done in a BYK Abrasion Tester (from BYK-Gardner USA, Columbus, Md.) with a linear, back-and-forth action, attempting to scratch off the image-side of the samples (5 cycles). The image durability is evaluated visually from the printed samples using a scale of 1-5 (with 1 being the worst and 5 being the best).

Fire retardancy is evaluated by Diversified Test Lab Inc., complying with FR NFPA 701 standard and is also evaluated by Hewlett Packard's internal test with CA 1237 standard. The printed samples are evaluated with a scale of 1-5 (with 1 being the worst and 5 being the best).

TABLE 6

| Example ID | Gamut | Image Quality | | | Image Durability | | | Fire retardancy |
| | | Ink bleed | Ink strike through | Image gloss (60°) | Ink transfer | Coin scratch | Rubbing resistance | |
| --- | --- | --- | --- | --- | --- | --- | --- | --- |
| Sample 1 | 360 K | 5 | 5 | 3% | 5− | 5 | 5− | 5 |
| Sample 2 | 360 K | 5 | 5 | 3% | 5 | 5 | 4+ | 5 |
| Sample 3 | 377 K | 5 | 5− | 4% | 5 | 5 | 4+ | 4 |
| Sample 4 | 370 K | 5 | 5 | 3% | 5 | 5− | 4 | 5− |
| Sample 5 Comparative | 305 K | 3 | 2 | 2% | 5 | 5 | 3 | 5 |
| Sample 6 Comparative | 369 K | 5 | 5− | 3% | 5 | 5 | 4 | 3 |

As can be seen by the test results above, the fabric printable medium according to the present disclosure provides several advantages over the comparative samples in terms of image quality, image durability and Fire retardancy performances. It is noted that though some comparative medium performed well in some categories, they performed poorly in others. In accordance with examples of the present disclosure, over these tests, performance is collectively better when using the fabric printable medium described herein.

The invention claimed is:

1. A fabric printable medium, with an image-side and a back-side, comprising:
   a. a fabric base substrate defining the image-side and the back-side;
   b. an image-receiving coating layer, applied on the image-side of the fabric base substrate, comprising a first and a second crosslinked polymeric network;
   c. a fire retarding barrier layer, applied to the back-side of the fabric base substrate, comprising polymeric binders and filler particles with flame retardancy properties; and
   d. a migration control finish layer comprising a film-formable polymer and a flame retardant agent, applied on each of the image-side and the back-side of the fabric base substrate at a coat-weight ranging from about 0.5 to 5 gsm.

2. The fabric printable medium of claim 1 wherein, in the migration control finish layer, the film-formable polymer is selected from the group consisting of acrylonitrile-butadiene polymer, acrylic polymer and polyurethane or polyurethane-acrylic polymer.

3. The fabric printable medium of claim 1 wherein, in the migration control finish layer, the flame retardant agent is selected from the group consisting of phosphorus-containing compounds, nitrogen-containing compounds, organophosphate compounds, alumina trihydrate and calcium carbonate.

4. The fabric printable medium of claim 1 wherein, in the fire retarding barrier layer, the polymeric binder is a polymer or a copolymer selected from the group consisting of acrylic polymers or copolymers, vinyl acetate polymers or copolymers, polyester polymers or copolymers, vinylidene chloride polymers or copolymers, butadiene polymers or copolymers, styrene-butadiene polymers or copolymers and acrylonitrile-butadiene polymers or copolymers.

5. The fabric printable medium of claim 1 wherein the fire retarding barrier layer is applied at a coat-weight ranging from about 10 to 20 gsm.

6. The fabric printable medium of claim 1 wherein, in the image-receiving coating composition, the first crosslinked polymeric network and the second crosslinked polymeric network are different and independently comprise polyacrylate, polyurethane, vinyl-urethane, acrylic urethane, polyurethane-acrylic, polyether polyurethane, polyester polyurethane, polycaprolactam polyurethane, polyether polyurethane, alkyl epoxy resin, epoxy novolac resin, polyglycidyl resin, polyoxirane resin, polyamine, styrene maleic anhydride, a derivative thereof, or a combination thereof.

7. The fabric printable medium of claim 1 wherein, in the image-receiving coating composition, the first and second crosslinked polymeric networks can collectively represent from about 80 wt % to about 99 wt % of the total weight of the image-receiving layer.

8. The fabric printable medium of claim 1 wherein the image-receiving coating composition is applied at a coat-weight ranging from about 1 to about 20 gsm.

9. A method for forming a fabric printable medium comprising:

a. providing a fabric base substrate with an image-side and a back-side;
b. applying a migration control finish layer comprising a film-formable polymer and a flame retardant agent on each of the image-side and the back-side of the fabric base substrate, at a coat-weight ranging from about 0.5 to 5 gsm;
c. applying an image-receiving coating layer, comprising a first and a second crosslinked polymeric network, over the migration control finish layer on the image side of the fabric base substrate; and
d. applying a fire retarding barrier layer comprising polymeric binder and filler particles with flame retardancy properties, on the back-side of the fabric base substrate.

10. A printing method comprising:
a. obtaining a fabric printable medium comprising a fabric base substrate; an image-receiving coating layer, applied on an image-side of the fabric base substrate, comprising a first and a second crosslinked polymeric network; a fire retarding barrier layer, applied to a back-side of the fabric base substrate, comprising polymeric binder and filler particles with flame retardancy properties; and a migration control finish layer comprising a film-formable polymer and a flame retardant agent, applied to each of the image-side and the back-side of the fabric base substrate at a coat-weight ranging from about 0.5 to 5 gsm; and
b. applying an ink composition onto said fabric printable medium to form a printed image on the image-side.

* * * * *